United States Patent
Brunel et al.

(10) Patent No.: US 8,068,444 B2
(45) Date of Patent: Nov. 29, 2011

(54) METHOD AND APPARATUS FOR COMMUNICATING DOWNLINK AND UPLINK SUB-FRAMES IN A HALF DUPLEX COMMUNICATION SYSTEM

(75) Inventors: Loic Brunel, Rennes Cedex (FR); David Mottier, Rennes Cedex (FR)

(73) Assignee: Mitsubishi Electric Corporation, Tokyo (JP)

(*) Notice: Subject to any disclaimer, the term of this patent is extended or adjusted under 35 U.S.C. 154(b) by 77 days.

(21) Appl. No.: 12/091,139

(22) PCT Filed: Sep. 28, 2006

(86) PCT No.: PCT/EP2006/009432
§ 371 (c)(1),
(2), (4) Date: Apr. 22, 2008

(87) PCT Pub. No.: WO2007/048478
PCT Pub. Date: May 3, 2007

(65) Prior Publication Data
US 2008/0232278 A1    Sep. 25, 2008

(30) Foreign Application Priority Data

Oct. 26, 2005  (EP) .................................... 05292273
Jan. 13, 2006  (EP) .................................... 06290095

(51) Int. Cl.
*H04B 1/56* (2006.01)

(52) U.S. Cl. ...................................................... 370/275

(58) Field of Classification Search .................. 370/337, 370/445, 335, 275
See application file for complete search history.

(56) References Cited

U.S. PATENT DOCUMENTS

| 6,973,065 B2 * | 12/2005 | Hayashi et al. ............... 370/335 |
| 2004/0002334 A1 | 1/2004 | Lee et al. |
| 2004/0052271 A1 | 3/2004 | Yu |

FOREIGN PATENT DOCUMENTS

| EP | 1 209 938 | 5/2002 |
| EP | 1 213 855 | 6/2002 |

\* cited by examiner

*Primary Examiner* — Derrick Ferris
*Assistant Examiner* — Gbemileke Onamuti
(74) *Attorney, Agent, or Firm* — Oblon, Spivak, McClelland, Maier & Neustadt, L.L.P.

(57) ABSTRACT

A method communicating downlink and uplink sub-frames between a base and at least one half duplex user equipment. For a scheduled synchronization time, beginning of reception of an effective part of the uplink sub-frame is separated from end of transmission of an effective part of the first downlink sub-frame by a duration of the difference between a single idle period and an incremental timing advance value. The single idle period, having a duration greater than or equal to summation of downlink/uplink and uplink/downlink required minimum idle durations, is reserved in the end of the first downlink sub-frame or the beginning of the uplink sub-frame, or both. The incremental timing advance value is greater than or equal to the uplink/downlink required minimum idle duration and lower than or equal to the difference between the duration of the single idle period and the downlink/uplink required minimum idle duration.

4 Claims, 8 Drawing Sheets

METHOD AND APPARATUS FOR COMMUNICATING DOWNLINK AND UPLINK SUB-FRAMES IN A HALF DUPLEX COMMUNICATION SYSTEM

The present invention relates generally to a method for communicating downlink and uplink sub-frames between a base station and at least one user equipment in a half duplex communication system. It relates also in its hardware-oriented aspects to a communication apparatus, a user equipment and a half duplex communication system. Finally, the present invention relates to a frame of a half duplex communication system.

Figure 1:
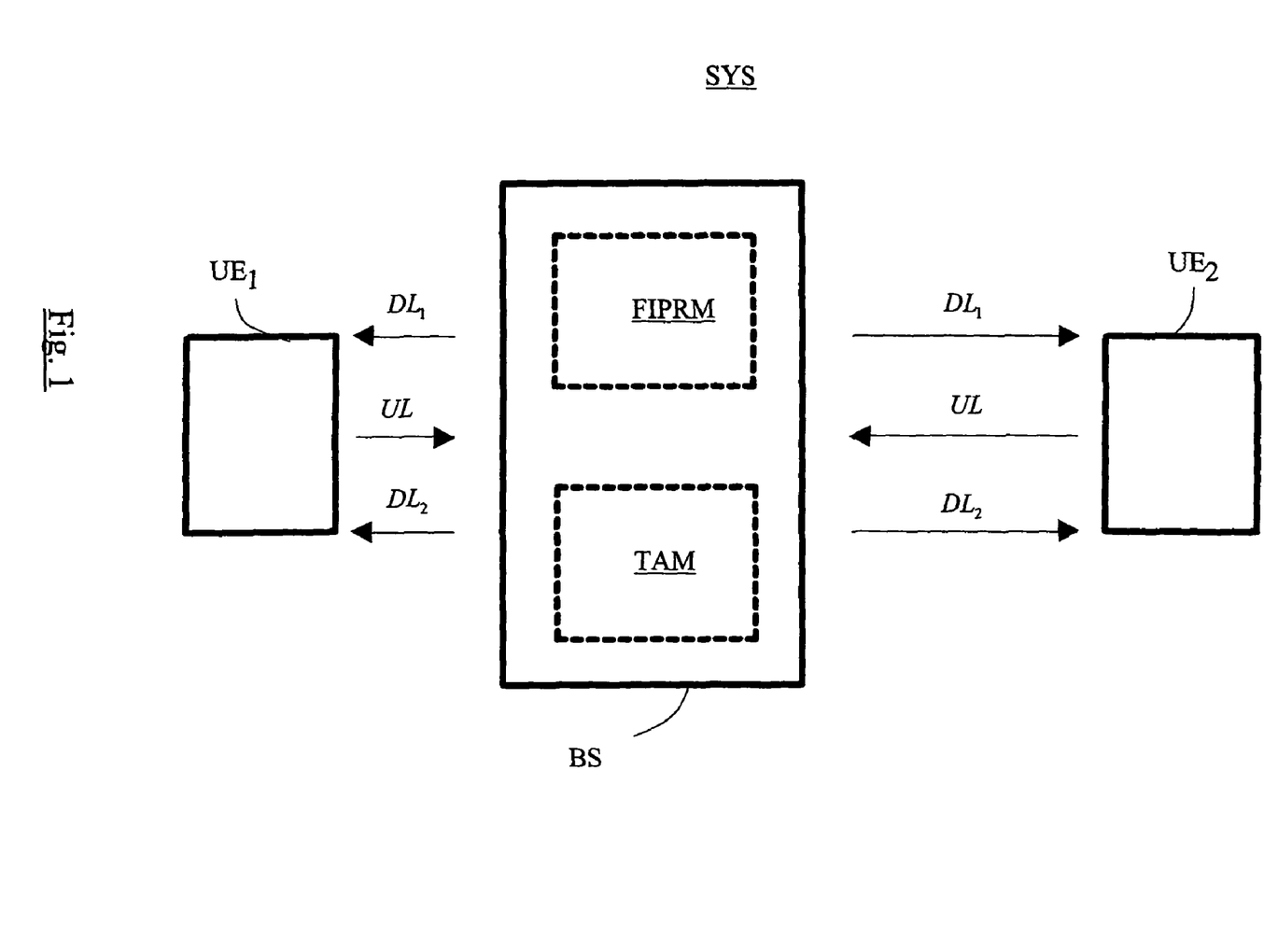
FIG. 1 represents a schema of a half duplex communication system SYS.

FIG. 1 represents a schema of a half duplex communication system SYS which can, for example, be a Time Division Duplex (TDD) or a Half Duplex Frequency Division Duplex (HD FDD) communication system. The communication system SYS allows half-duplex communications between the base station BS and half duplex user equipments $UE_i$ (i=1,2). Said half duplex user equipments will be referred in the following to as user equipments and may be located at different distances from the base station BS. In the example depicted in FIG. 1, the user equipment $UE_1$ is closer to the base station BS than the user equipment $UE_2$.

The base station BS is equipped with communication means (not depicted in FIG. 1) for transmitting downlink sub-frames $DL_1$ and $DL_2$ to the user equipments $UE_i$, and for receiving uplink sub-frames UL from them. It includes also means for defining frame idle periods reservation (FIPRM), the function of which is described below, and timing advance means (TAM) which implement a timing advance mechanism also explained below.

During a half duplex communication between the base station BS and a user equipment $UE_i$, a downlink sub-frame $DL_1$ is transmitted by the base station BS to the user equipment $UE_i$. This transmission is followed by the transmission of an uplink sub-frame $UL^i$, sent by this user equipment $UE_i$ to the base station BS. In the following, the notation UL is used for designating an uplink sub-frame independently from the user equipment UEi which transmits it. The transmission of the uplink sub-frame $UL^i$ is then followed by the transmission of another downlink sub-frame $DL_2$. In the following, the succession of the downlink sub-frame $DL_1$ followed by the uplink sub-frame $UL^i$ followed by the downlink sub-frame $DL_2$ is called a frame.

Figure 2:
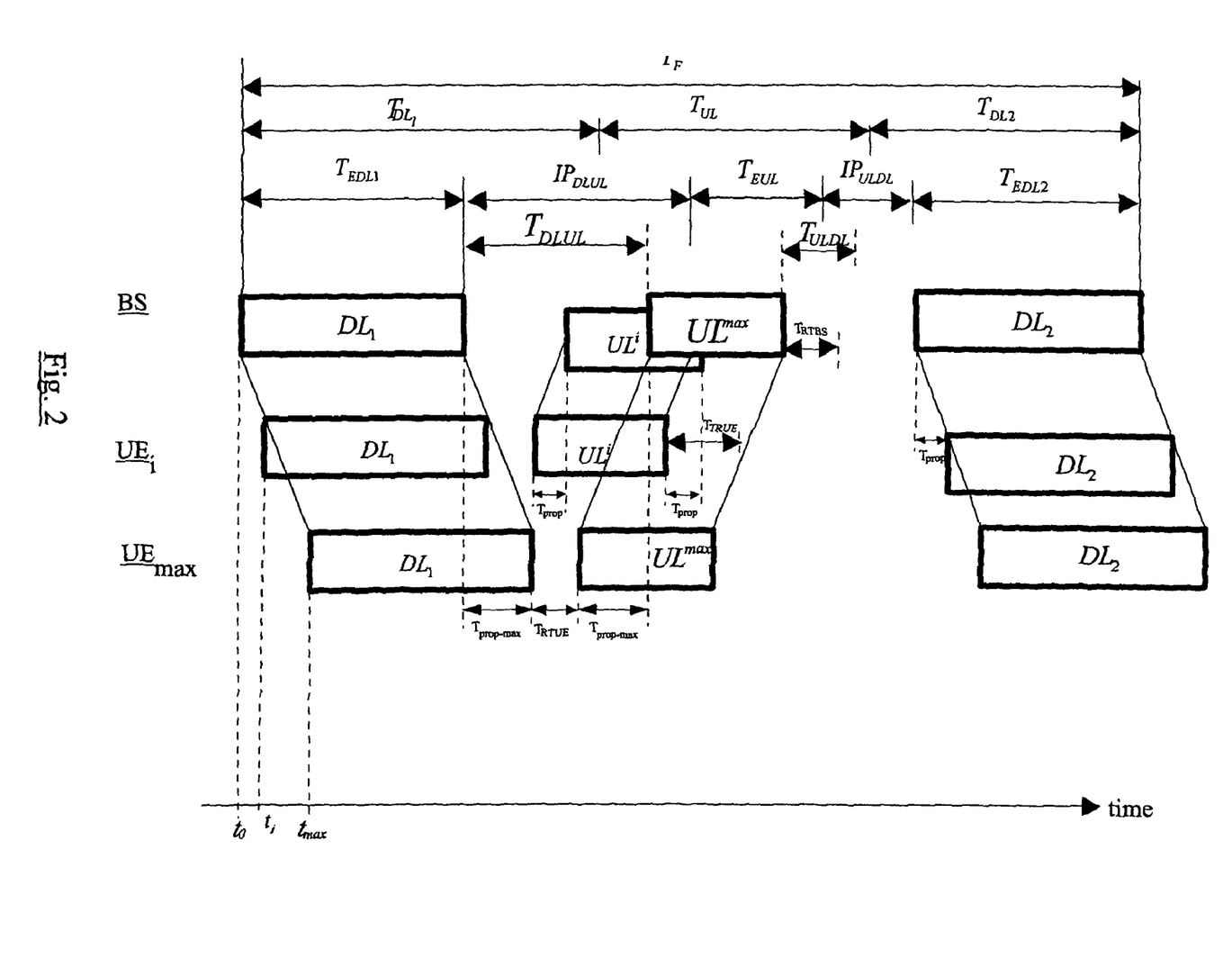
FIG. 2 represents an example of a chronogram which depicts the transmission of a frame of a communication system according to the state of the art.

FIG. 2 represents chronograms which depict the transmission of a frame of a half duplex communication system according to the state of the art. A frame includes a downlink sub-frame $DL_1$ with a predefined duration $T_{DL1}$, sub-frame which is followed by an uplink sub-frame UL with predefined duration $T_{UL}$, sub-frame which is itself followed by another downlink sub-frame $DL_2$ with predefined duration $T_{DL2}$. Note that these sub-frames do not necessarily have the same predefined duration, i.e. $T_{DL1}$ may be different from $T_{DL2}$, $T_{DL1}$ may be different from $T_{UL}$ and $T_{DL2}$ may be different from $T_{UL}$.

When the transmission of the first downlink sub-frame DL1 starts at a time $t_0$, its reception at a user equipment $UE_i$ starts at a time $t_i$, depending on the distance between the base station BS and the user equipment $UE_i$.

Between each transmission of two consecutive sub-frames of the frame, an idle period is usually reserved, thanks to the FIPRM means, to avoid interference between two consecutive sub-frames and to avoid imposing any requirement on the half duplex base station BS and user equipments $UE_i$ to simultaneously receive and transmit consecutive sub-frames. According to the state of the art, an idle period $IP_{DLUL}$, called a downlink/uplink idle period, is defined between the downlink sub-frame $DL_1$ and the uplink sub-frame UL, and another idle period $IP_{ULDL}$, called the uplink/downlink idle period, is defined between the uplink sub-frame UL and the downlink sub-frame $DL_2$. As a result, the effective transmission duration $T_E$ in which symbols embedded into the frame are transmitted is shorter than the total transmission duration of that frame $T_F$. The total frame transmission duration $T_F$ which is a predefined and fixed value is thus defined by the following equation:

$$T_F = T_E + T_I$$

with $T_I$ being the frame idle period duration in which the base station BS is inactive. The frame idle period duration $T_I$ is the sum of idle period durations reserved in the frame. The effective transmission duration TE is the sum of the effective transmission duration $T_{EDL1}$ of symbols embedded in the downlink sub-frame $DL_1$, the effective transmission duration $T_{EUL}$ of symbols embedded in the uplink sub-frame UL and the effective transmission duration $T_{EDL2}$ of symbols embedded in the downlink sub-frame $DL_2$.

An idle period ($IP_{DLUL}$ or $IP_{ULDL}$) between the transmission of two consecutive sub-frames shall respect some requirements which define a required minimum idle duration of this idle period in order to allow the base station BS to manage correctly communications with each user equipment in communication with it. These requirements depend on the transmission scenario of sub-frames which is either a downlink sub-frame followed by an uplink sub-frame (DL/UL scenario) or an uplink sub-frame followed by a downlink sub-frame (UL/DL scenario).

The base station BS cannot transmit to a user equipment $UE_i$ during a required minimum idle duration $T_{DLUL}$, called in the following downlink/uplink required minimum idle duration, before a scheduled starting time for receiving by the base station BS the effective part of the uplink sub-frame $UL^i$ sent by the user equipment $UE_i$. The downlink/uplink required minimum idle duration $T_{DLUL}$, during which the base station BS is not active for that user equipment $UE_i$, has to be larger than twice the propagation time $T_{prop}$ between the base station BS and the user equipment $UE_i$, plus the switching duration $T_{RTUE}$ for the user equipment $UE_i$ to switch from Receive to Transmit mode. Note that $T_{RTUE}$ may not only include radio frequency device switching durations but also some additional margins to allow immediate processing of downlink control information in order to adapt the following uplink transmission. Thus, as the maximum value $2 \times T_{prop-max}$ is the round trip delay between the base station BS and the user equipment $UE_{max}$ located at the border of the cell covered by the base station BS, the downlink/uplink required minimum idle duration $T_{DLUL}$ is dimensioned approximately according to the cell radius by the following equation:

$$T_{DLUL} = 2 \cdot T_{prop-max} + T_{RTUE} = \frac{2 \cdot R}{c} + T_{RTUE} \qquad (1)$$

where c is the celerity of the light and R the effective cell radius.

The effective cell radius R is increased as the variance of the shadow fading is increased. Note that in some cases, the delay spread of the channel must be added.

Besides the base station BS cannot transmit to the user equipment $UE_i$ during the required minimum idle duration $T_{ULDL}$, called in the following uplink/downlink required minimum idle duration, after a scheduled ending time for receiving by the base station BS the effective part of the uplink sub-frame $UL^i$, to allow radio frequency switching (note: a half-duplex base station operating in unpaired spectrum is assumed here; a full duplex base station would not have radio frequency switching duration). As depicted in FIG. 2, the uplink/downlink required minimum idle duration $T_{ULDL}$ during which the base station is not active, has to be larger than the switching duration $T_{RTBS}$ for the base station BS to switch from Receive to Transmit mode as depicted in FIG. 2. $T_{TRUE}$ is the user equipment $UE_i$'s switching duration which is, in the case of FIG. 2, greater than $T_{RTBS}$. Note that $T_{RTBS}$ may not only include radio frequency device switching duration but also some additional margin to allow immediate processing of uplink control information in order to adapt the following downlink transmission.

Thus, the uplink/downlink required minimum idle duration $T_{ULDL}$, function of the user equipment and base station BS switching durations $T_{TRUE}$, $T_{RTBS}$ and of the propagation delay $T_{prop}$, is defined by the following equation:

$$T_{ULDL} = \max(T_{TRUE} - 2 \cdot T_{prop}, T_{RTBS}) \quad (2)$$

As $T_{prop}$ increases, any impact of the user equipment $UE_i$ switching duration on $T_{ULDL}$ is reduced. In reality, the communication system needs to cope with a range of $T_{prop}$ values, including down to $T_{prop} \sim 0$, and so the uplink/downlink required minimum idle duration $T_{ULDL}$ becomes set by the maximum of the user equipment $UE_i$ or base station BS switching durations. These switching durations are however expected to be negligible. From (1) and (2), we may have $T_{ULDL}$ much shorter than $T_{DLUL}$. In practice, $T_{ULDL}$ is usually close to 8 µs and $T_{DLUL}$ to 30 µs for a cell radius R equal to 5 km.

When block-wise transmission is performed in the half duplex communication system SYS, for instance using an Orthogonal Frequency Division Multiplexing (OFDM) modulation technique with or without cyclic prefix, a Single-Carrier Frequency Domain Multiple Access (SC-FDMA) technique such as Interleaved Frequency Division Multiple Access (IFDMA) or DFT-spread OFDM, or Code Division Multiple Access (CDMA) based techniques, the block structure of data can be advantageously taken into account for the dimensioning of the idle periods. For instance, each idle period can be chosen as a multiple of a symbol duration (duration of symbols carried by either uplink sub-frames or by downlink sub-frames), the symbol being the block of samples (e.g., an OFDM symbol including the cyclic prefix, a SC-FDMA symbol including the cyclic prefix, etc.). Since uplink and downlink sub-frames are composed of a multiple number of symbols, the idle periods reservation allows adapting each idle period with respect to the cell range while keeping same transmission parameters (e.g. sampling frequency, FFT size, length of cyclic prefix, etc. . .) among sub-frames of a same link. This is advantageous because when idle periods are not needed during the communication of sub-frames, these idle periods can be replaced by symbols. Furthermore, as block-wise transmission may also lie used for full duplex transmissions, a higher commonality between half duplex and full duplex is guaranteed.

Usually the required minimum idle durations given in (1) and (2) may not exactly match a multiple of a symbol duration. This leads to over-dimension the idle periods, i.e. to find, for each idle period which should be defined from its required minimum idle duration, the smallest idle period that is larger or equal to its required minimum idle duration and which is a multiple of a symbol duration.

Figure 3:
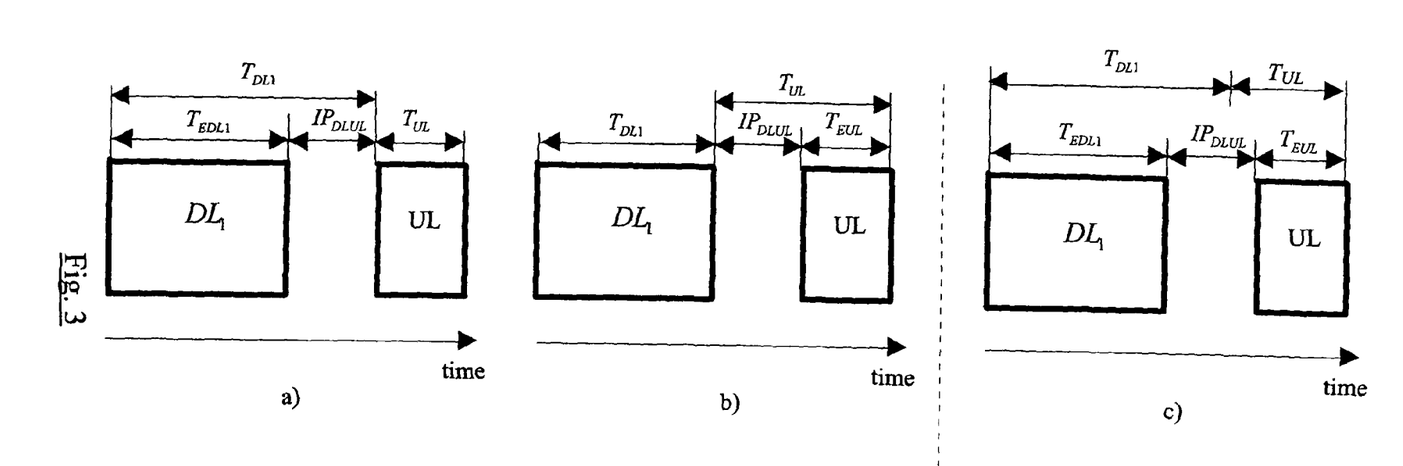
FIGS. 3 and 4 represent examples of chronograms which depict frame idle periods reservations in the half duplex communication system SYS.
Figure 4:
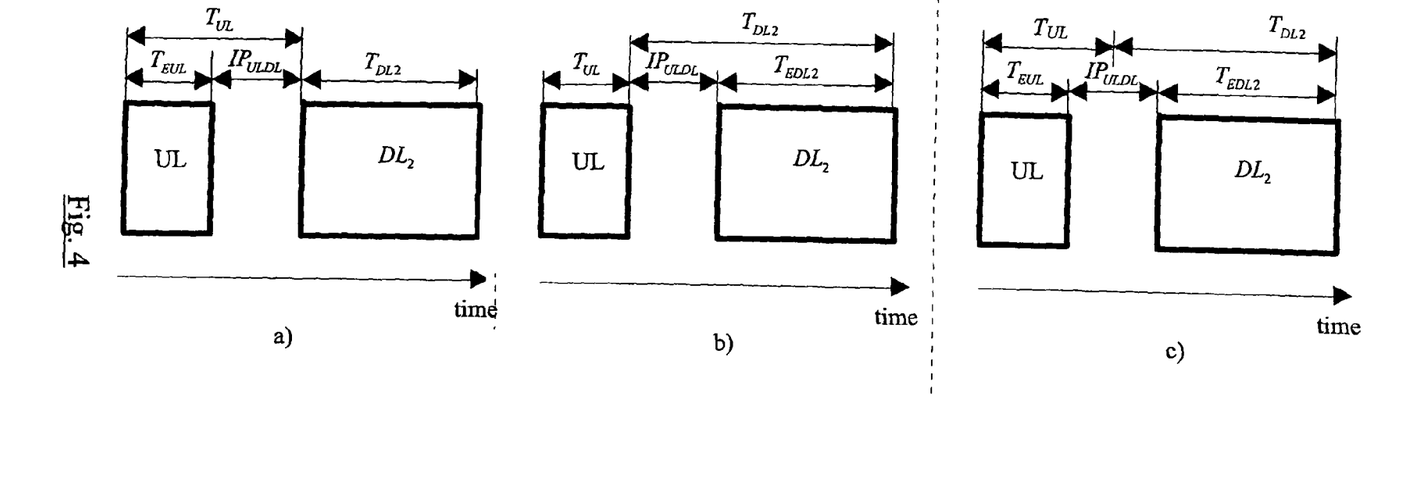

Roughly speaking, idle periods may be taken out of either a downlink sub-frame, or the uplink sub-frame or both as depicted more precisely in FIGS. 3 and 4.

FIGS. 3 and 4 represent examples of chronograms which depict frame idle periods reservations in the half duplex communication system SYS.

The downlink/uplink idle duration $IP_{DLUL}$ can be reserved either in the preceding downlink sub-frame $DL_1$ as depicted in FIG. 3a, or the following uplink sub-frame as depicted in FIG. 3b or both as depicted in FIG. 3c.

When the idle period $IP_{DLUL}$ is taken out of the downlink sub-frame $DL_1$, symbols embedded in the downlink sub-frame $DL_1$ are transmitted only during the effective transmission duration $T_{EDL1}$ as depicted in FIG. 3a. The idle period $IP_{DLUL}$ is then given by:

$$IP_{DLUL} = \left\lceil \frac{T_{DLUL}}{T_{SDL1}} \right\rceil \cdot T_{SDL1} \quad (3)$$

by taking into account a suitable dimensioning of the downlink/uplink required minimum idle duration $T_{DLUL}$ according to the above-mentioned requirements and the duration $T_{SDL1}$ of symbols embedded in the downlink sub-frame $DL_1$. Here, $\lceil x \rceil$, defines the smallest integer larger than x.

Alternatively, when the idle period $IP_{DLUL}$ is taken out of the uplink sub-frame UL, symbols embedded in the uplink sub-frame UL are transmitted only during the effective transmission duration $T_{EUL}$ as depicted in FIG. 3b. The idle period $IP_{DLUL}$ is then given by:

$$IP_{DLUL} = \left\lceil \frac{T_{DLUL}}{T_{SUL}} \right\rceil \cdot T_{SUL} \quad (4)$$

by taking into account a suitable dimensioning of the downlink/uplink idle period $IP_{DLUL}$ according to the above-mentioned requirements and the uplink symbol duration $T_{SUL}$.

Alternatively, when the idle period $IP_{DLUL}$ is taken out of both the downlink sub-frame $DL_1$ and the uplink sub-frame UL, the downlink/uplink required minimum duration $T_{DLUL}$ is equal to the summation of a downlink/uplink required duration $T^1_{DLUL}$ taken out of the downlink sub-frame $DL_1$ and of a downlink/uplink required duration $T^2_{DLUL}$ taken out of the uplink sub-frame UL. Symbols embedded in the downlink sub-frame $DL_1$ are thus transmitted only during the effective transmission duration $T_{EDL1}$ and symbols embedded into the uplink sub-frame UL are only transmitted during the effective transmission duration $T_{EUL}$ as depicted in FIG. 3c. The idle period $IP_{DLUL}$ is given by:

$$IP_{DLUL} = \left\lceil \frac{T^1_{DLUL}}{T_{SDL1}} \right\rceil \cdot T_{SDL1} + \left\lceil \frac{T^2_{DLUL}}{T_{SUL}} \right\rceil \cdot T_{SUL} \quad (5)$$

by taking into account a suitable dimensioning of the downlink/uplink required minimum idle duration $T_{DLUL}$ according to the above-mentioned requirements and the downlink symbol duration $T_{SDL1}$ for the part of the idle period in the downlink sub-frame $DL_1$, and the uplink symbol duration $T_{SUL}$ for the part of the idle period in the uplink sub-frame.

The uplink/downlink idle period $IP_{ULDL}$ can also be taken out of either the preceding uplink sub-frame (as depicted in FIG. 4a), or the following downlink sub-frame as depicted in FIG. 4b) or both (as depicted in FIG. 4c).

When the uplink/downlink idle period $IP_{ULDL}$ is taken out of the uplink sub-frame UL symbols embedded in the uplink sub-frame UL are transmitted only during the effective transmission duration $T_{EUL}$ as depicted in FIG. 4a. The idle period $IP_{ULDL}$ is then given by:

$$IP_{ULDL} = \left\lceil \frac{T_{ULDL}}{T_{SUL}} \right\rceil \cdot T_{SUL} \quad (6)$$

by taking into account a suitable dimensioning of the uplink/downlink required minimum idle duration $T_{ULDL}$ according to the above-mentioned requirements and the duration $T_{SUL}$.

Alternatively, when the uplink/downlink idle period duration $IP_{ULDL}$ is taken out of the downlink sub-frame $DL_2$ (see FIG. 4b), symbols embedded in the downlink sub-frame $DL_2$ are transmitted only during the effective transmission duration $T_{EDL2}$ as depicted in FIG. 4b. The idle period $IP_{ULDL}$ is then given by:

$$IP_{ULDL} = \left\lceil \frac{T_{ULDL}}{T_{SDL2}} \right\rceil \cdot T_{SDL2} \quad (7)$$

by taking into account a suitable dimensioning of the uplink/downlink required minimum idle duration $T_{ULDL}$ according to the above-mentioned requirements and the downlink symbol duration $T_{SDL2}$.

Alternatively, when the uplink/downlink idle period $IP_{ULDL}$ is taken out of both the downlink sub-frame $DL_2$ and the uplink sub-frame UL, the uplink/downlink required minimum duration $T_{ULDL}$ is equal to the summation of a uplink/downlink required duration $T^1_{ULDL}$ taken out of the uplink sub-frame UL and of a uplink/downlink required duration $T^2_{ULDL}$ taken out of the downlink sub-frame $DL_2$. Symbols embedded in the downlink sub-frame $DL_2$ are transmitted only during the effective transmission duration $T_{EDL2}$ and symbols embedded in the uplink sub-frame UL are transmitted during the effective transmission $T_{EUL}$ as depicted in FIG. 4c. The idle period $IP_{ULDL}$ is given by:

$$IP_{ULDL} = \left\lceil \frac{T^1_{ULDL}}{T_{SUL}} \right\rceil \cdot T_{SUL} + \left\lceil \frac{T^2_{ULDL}}{T_{SDL2}} \right\rceil \cdot T_{SDL2} \quad (8)$$

by taking into account a suitable dimensioning of the uplink/downlink required minimum idle duration $T_{ULDL}$ according to the above-mentioned requirements and the uplink symbol duration $T_{SUL}$ for the part of the idle period in the uplink sub-frame UL, and the downlink symbol duration $T_{SDL2}$ for the part of the idle period in the downlink sub-frame $DL_2$.

Idle periods are reserved in a frame using a combination of one configuration depicted in FIG. 3 with one configuration depicted in FIG. 4. Note that when a configuration of FIG. 3 defines the effective duration of the uplink sub-frame UL as being equal to the total duration $T_{UL}$, for example the configuration depicted in FIG. 3a, this effective transmission duration is reduced if a configuration of FIG. 4 defines that the idle period $IP_{ULDL}$ (or a part of it) is reserved in the end of the uplink sub-frame UL, for example configuration depicted in FIG. 4a.

Whatever the considered reservation of idle periods $IP_{DLUL}$ and $IP_{ULDL}$, some parts of the total communication duration of downlink and/or uplink sub-frames are lost due to the over-dimensioning of idle periods, which may result in a significant decrease of the effective transmission duration $T_E$, especially for large symbol duration $T_{SDL1}$, $T_{SDL2}$ and/or $T_{SUL}$.

Usually and independently from the idle periods reservation, the effective parts of the uplink sub-frames UL sent by each user equipment $UE_i$ are all received at a same time, called the synchronization time of uplink sub-frames, in order to be synchronized at the base station BS. This leads to an optimization of the base station processing. A user equipment $UE_i$, knowing only the starting time $t_i$ of the reception of the downlink sub-frame $DL_1$, the effective downlink sub-frame duration $T_{EDL1}$ and the duration of the idle period $IP_{DLUL}$, is thus assumed to transmit the effective part of the uplink sub-frame UL at the time $t_i + T_{EDL1} + T_{RTUE}$. As depicted in FIG. 2, time $t_i$ being function of the distance between the base station BS and the user equipment $UE_i$, transmitting the effective part of its uplink sub-frame UL at the time $t_i + T_{EDL1} + T_{RTUE}$ does not allow the synchronization of all uplink sub-frames at the base station at the synchronization time. For that, the timing advance means TAM are used.

Figure 5:
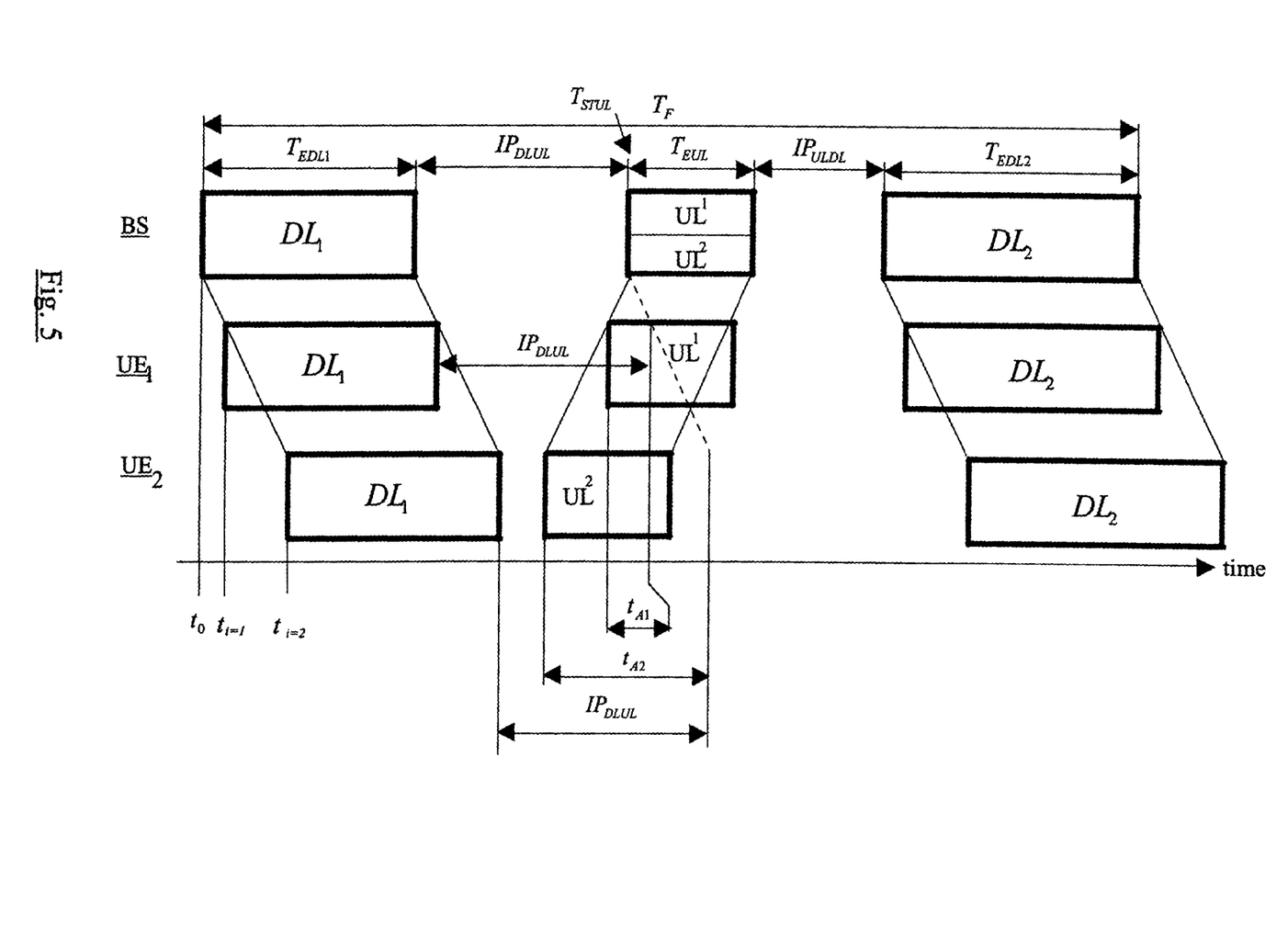
FIG. 5 represents chronograms which illustrate the timing advance mechanism used by a base station for synchronizing uplink sub-frames according to the state of the art.

FIG. 5 represents chronograms which illustrate the timing advance mechanism used by the base station BS for synchronizing uplink sub-frames according to the state of the art.

From the user equipment perspective, a timing alignment mechanism consists in waiting for a certain amount of time after the end of the reception of the first downlink sub-frame $DL_1$ before starting the transmission of the effective part of the uplink sub-frame $UL^i$ by a user equipment $UE_i$ in order to align its reception starting time $T_{STUL}$ at the base station BS together with the reception starting time of the effective parts of the uplink sub-frames sent by other user equipments also performing this mechanism. This timing alignment mechanism is also called a timing advance mechanism.

In such a mechanism, the user equipment $UE_i$ transmits its uplink sub-frame $UL^i$ at a time advanced by a timing advance value $t_{Ai}$ from a reference time defined by the following equation:

$$t_i + T_{EDL1} + IP_{DLUL}$$

For that, the base station BS sends to each user equipment $UE_i$ the timing advance value $t_{Ai}$ from which a user equipment $UE_i$ defines the time at which it shall start the transmission of the effective part of the uplink sub-frame $UL^i$. The timing advance mechanism requires thus the estimation at the base station BS of the propagation delay from the base station BS to each user equipment $UE_i$ in order to define such timing advance values $t_{Ai}$. Thus, as depicted in FIG. 5, the user equipment $UE_1$ transmits the effective part of its uplink sub-frame $UL^1$ at the time $t_{im1} + T_{EDL1} + IP_{DLUL} - t_{A1}$ and the user equipment $UE_2$, located at a larger distance from the base station BS transmits the effective part of its uplink sub-frame $UL^2$ at the time $t_{im2} + T_{EDL1} + IP_{DLUL} - t_{A2}$.

Note that in block-wise transmission, the timing advance values may be a fraction of the symbol duration.

As explained above, the effective transmission duration TE may be significantly reduced due to the over-dimensioning of idle periods $IP_{ULDL}$ and $IP_{ULDL}$.

The present invention aims at solving this problem by disclosing a method for communicating downlink and uplink sub-frames between a base station and at least one half duplex user equipment in a half duplex communication system, said method includes
 a first transmission step in the course of which a first downlink sub-frame is transmitted by the base station to said at least one half duplex user equipment,
 a reception step following said first transmission step in the course of which an uplink sub-frame transmitted from said at least half duplex one user equipment is expected to be received by said base station after at least a downlink/uplink required minimum idle duration defined between the end of the transmission of the effective part of said first downlink sub-frame and the beginning of the reception of the effective part of said uplink sub-frame, a second transmission step following said reception step in the course of which a second downlink sub-frame is transmitted by the base station to said at least one half duplex user equipment after at least an uplink/downlink required minimum idle duration defined between the end of the reception of the effective part of said uplink sub-frame and the beginning of the transmission of the effective part of said second downlink sub-frame, and a timing advance value definition step in the course of which a timing advance value is transmitted to each of said at least one half duplex user equipment once it has been defined for each of said at least one half duplex user equipment in order that the beginning of the effective parts of the uplink sub-frames sent by each of said at least one half duplex user equipment is received at a same scheduled synchronisation time, said method is characterised in that said scheduled synchronisation time is such that the beginning of the reception of the effective part of said uplink sub-frame is separated from the end of the transmission of the effective part of said first downlink sub-frame by a duration which is equal to the difference between a single idle period and an incremental timing advance value, said single idle period, having a duration greater than or equal to the summation of said downlink/uplink required minimum idle duration and said uplink/downlink required minimum idle duration, is reserved in either the end of said first downlink sub-frame, or the beginning of said uplink sub-frame, or both, said incremental timing advance value being greater than or equal to said uplink/downlink required minimum idle duration and lower than or equal to the difference between the duration of said single idle period and said downlink/uplink required minimum idle duration.

This method is advantageous because it avoids to define a separate over-dimensioning of the required minimum uplink/downlink idle duration, increasing in that way either the effective transmission duration or the coverage of the base station or both.

According to another aspect of the present invention, said communication system being adapted to communicate also in full duplex downlink and uplink sub-frames between said base station and at least one full duplex user equipment, the method is characterised in that said at least one full duplex user equipment is informed by the base station of a timing advance value defined in the course of said timing advance value definition step in order that the beginning of the effective parts of the uplink sub-frames sent by each of said at least one full duplex user equipment is received at said scheduled synchronisation time.

This is advantageous for instance when said single idle period is reserved only in a downlink sub-frame (in a half duplex communication) because in that case the effective parts of the uplink sub-frames transmitted from all user equipments using either a full or half duplex communication are synchronised at a same time providing an increase of decoding performance at the base station BS.

According to another aspect of the present invention, the timing advance value transmitted to each of said half or full duplex user equipment being defined by two components, the summation of which is equal to said timing advance value, one of these two components being equal to said incremental timing advance value, the method is characterised in that the summation of said two components is executed by the base station.

This is advantageous because it avoids that the user equipment consumes resources such as battery or computing power for the computation of said addition.

According to an embodiment of the present invention, the timing advance value transmitted to each of said half or full duplex user equipment being defined by two components, the summation of which is equal to said timing advance value, one of these two components being equal to said incremental timing advance value, the addition of said two-components being computed by each of said at least one half or full duplex user equipment, the method is characterised in that said two components are transmitted to each of said at least one half or full duplex user equipment.

This is advantageous because it avoids the base station to support the computation of said addition and allows dynamic evolution of said incremental timing advance value during a communication.

According to an other embodiment of the present invention, the timing advance value transmitted to each of said half or full duplex user equipment being defined by two components, the summation of which is equal to said timing advance value, one of these two components being equal to said incremental timing advance value, the addition of said two-components being computed by each of said at least one half or full duplex user equipment, the method is characterised in that said incremental timing advance value is obtained from a memory of said at least one half or full duplex user equipment.

This is advantageous because it avoids the base station to send multiple times said incremental timing advance value.

Said half duplex communication system allowing block-wise transmissions, said single idle period is a multiple of a symbol duration.

This is advantageous because when idle periods are not needed during the communication of sub-frames, these idle periods can be replaced by control or data symbols. Furthermore, as block-wise transmission may also lie used for full duplex transmissions, a higher commonality between half duplex and full duplex is guaranteed.

According to another embodiment of the present invention, said half duplex communication system allowing block-wise transmissions, is characterised in that said single idle period is a sum of a multiple of the duration of symbols embedded into said first downlink sub-frame and a multiple of the duration of symbols embedded into said uplink sub-frame.

In one of its hardware oriented aspects, the present invention relates also to a communication apparatus involved in a communication system for the communication of downlink and uplink sub-frames with at least one half duplex user equipment of said communication system, said communication apparatus being intended to transmit a first downlink sub-frame to said at least one half duplex user equipment, to receive an uplink sub-frame transmitted from said at least one half duplex user equipment after at least a downlink/uplink required minimum idle duration defined between the end of the transmission of the effective part of said first downlink sub-frame and the beginning of the reception of the effective part of said uplink sub-frame, to transmit a second downlink sub-frame to said at least one half duplex user equipment after at least an uplink/downlink required minimum idle duration defined between the end of the reception of the effective part of said uplink sub-frame and the beginning of the transmission of the effective part of said second downlink sub-frame, and to transmit a timing advance value to each of said at least one half duplex user equipment once it has been defined for each of said at least one half duplex user equipment in order that the beginning of the effective parts of the uplink sub-frames sent by each of said at least one half duplex user equipment is received at a same scheduled synchronisation time, said communication apparatus is characterised in that it includes means for defining said scheduled synchronisation time such that the beginning of the reception of the effective part of said uplink sub-frame is separated from the end of the transmission of the effective part of said first downlink sub-frame by a duration which is equal to the difference between a single idle period and an incremental timing advance value, said single idle period having a duration greater than or equal to the summation of said downlink/uplink required minimum idle duration and said uplink/downlink required minimum idle duration, said incremental timing advance value being greater than or equal to said uplink/downlink required minimum idle duration and lower than or equal to the difference between the duration of said single idle period and said downlink/uplink required minimum idle duration, and means for reserving said single idle period in either the end of said first downlink sub-frame, or the beginning of said uplink sub-frame, or both.

According to another aspect of the present invention, said communication apparatus being adapted to communicate also in full duplex downlink and uplink sub-frames between said communication apparatus and at least one full duplex user equipment, the communication apparatus is characterised in that it includes means for informing each of said at least one full duplex user equipment of a timing advance value in order that the beginning of the effective parts of the uplink sub-frames sent by each of said at least one full duplex user equipment is received at said scheduled synchronisation time.

According to an embodiment of the present invention, the timing advance value transmitted to each of said half or full duplex user equipment being defined by two components, the summation of which is equal to said timing advance value, one of these two components being said incremental timing advance value, said communication apparatus includes means for adding said two components.

According to an embodiment of the present invention, the timing advance value transmitted to each of said half or full duplex user equipment being defined by two components, the summation of which is equal to said timing advance value, one of these two components being equal to said incremental timing advance value, each of said at least one half or full duplex user equipment being adapted for adding said two-components, the communication apparatus is characterised in that it includes means for transmitting said two components to each of said at least one half or full duplex user equipment.

In another of its hardware oriented aspect, the present invention relates to an user equipment intended to communicate downlink and uplink sub-frames with an above-mentioned communication apparatus in a communication system, the transmitted timing advance value being defined by two components, the summation of which is equal to said timing advance value, one of these two components being equal to said incremental timing advance value, said user equipment is characterised in that it includes means for adding said two components.

According to a variant of said user equipment, it further includes means for storing said incremental timing advance value.

Besides, in another of its hardware oriented aspect, the present invention relates to a communication system involving at least one user equipment and at least one above-mentioned communication apparatus.

According to a variant of said communication system, the transmitted timing advance value being defined by two components, the summation of which is equal to said timing advance value, one of these two components being equal to said incremental timing advance value, said communication apparatus further includes means for adding said two components.

According to another variant of said communication system, the transmitted timing advance value being defined by two components, the summation of which is equal to said timing advance value, one of these two components being equal to said incremental timing advance value, said communication apparatus is characterised in that it includes means for transmitting said two components and said at least one user equipment includes means for adding said two components.

According to another variant of said communication system, said at least one user equipment further includes means for storing said incremental timing advance value.

Finally, in another of its hardware oriented aspects, the present invention relates to a frame of a signal exchanged between a base station and at least one half duplex user equipment, said frame including a first downlink sub-frame followed by at least a downlink/uplink required minimum idle duration, followed by an uplink sub-frame, followed by at least an uplink/downlink required minimum idle duration followed by a second downlink sub-frame, a scheduled synchronisation time is defined for synchronising the beginning of the effective parts of the uplink sub-frames at the base station, said frame is characterised in that said scheduled synchronisation time is such that the beginning of the effective part of said uplink sub-frame is separated from the end of the effective part of said first downlink sub-frame by a duration which is equal to the difference between a single idle period and an incremental timing advance value, said single idle period, having a duration greater than or equal to the summation of said downlink/uplink required minimum idle duration and said uplink/downlink required minimum idle duration, is reserved in either the end of said first downlink sub-frame, or the beginning of said uplink sub-frame, or both, said incremental timing advance value being greater than or equal to said uplink/downlink required minimum idle duration and lower than or equal to the difference between the duration of said single idle period and said downlink/uplink required minimum idle duration.

The characteristics of the invention will emerge more clearly from a reading of the following description of an example embodiment, the said description being produced with reference to the accompanying drawings, among which.

Figure 6:
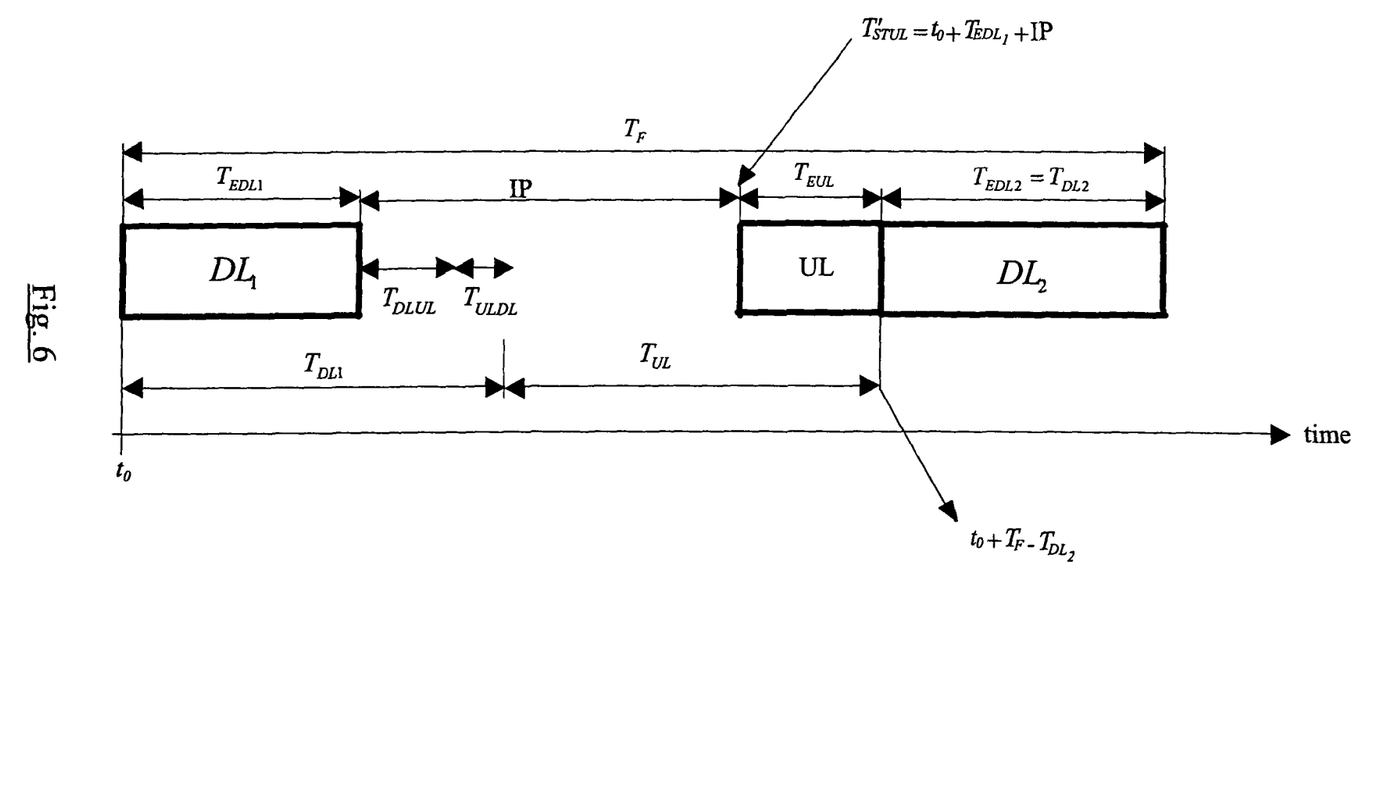
FIG. 6 represents a chronogram which depicts an example of a frame of a half duplex communication system according to the present invention.

FIG. 6 represents a chronogram which depicts an example of a frame of a half duplex communication system according to the present invention. The frame includes a first downlink sub-frame $DL_1$ with a predefined duration $T_{DL1}$, sub-frame which is followed by an uplink sub-frame UL with predefined duration $T_{UL}$, sub-frame which is itself followed by another downlink sub-frame $DL_2$ with predefined duration $T_{DL2}$. Note that these sub-frames do not necessarily have the same predefined duration, i.e. $T_{DL1}$ may be different from $T_{DL2}$, $T_{DL1}$ may be different from $T_{UL}$ and $T_{DL2}$ may be different from $T_{UL}$.

The frame includes a single idle period IP which is at least equal to the summation of the downlink/uplink required minimum idle duration $T_{DLUL}$ and the uplink/downlink required minimum idle duration $T_{ULDL}$. Note that the single idle period IP is defined by over-dimensioning this summation as explained in the opening paragraph. The single idle period IP is taken out of either the end of the first downlink sub-frame $DL_1$ or the beginning of the uplink sub-frame UL, or both.

Note that the frame does not include an idle period taken out of neither the end of the uplink sub-frame UL nor the beginning of the second downlink sub-frame $DL_2$.

Applying the timing advance mechanism above-described in the opening paragraph to the frame structure depicted in FIG. 6, the effective parts of uplink sub-frames transmitted from all user equipments are received synchronously at the base station BS at a time $T_{STUL}=t_0+T_{EDL1}+IP$. In that case, the reception of the effective parts of uplink sub-frames ends at a time $t_0+T_F-T_{DL2}$. Thus, as the second downlink sub-frame $DL_2$ has a fixed effective duration $T_{EDL2}=T_{DL2}$, there does not remain enough time to perform both the radio frequency switching and the transmission of the second downlink sub-frame $DL_2$ before the end of the frame at time $t_0+T_F$.

Figure 7:
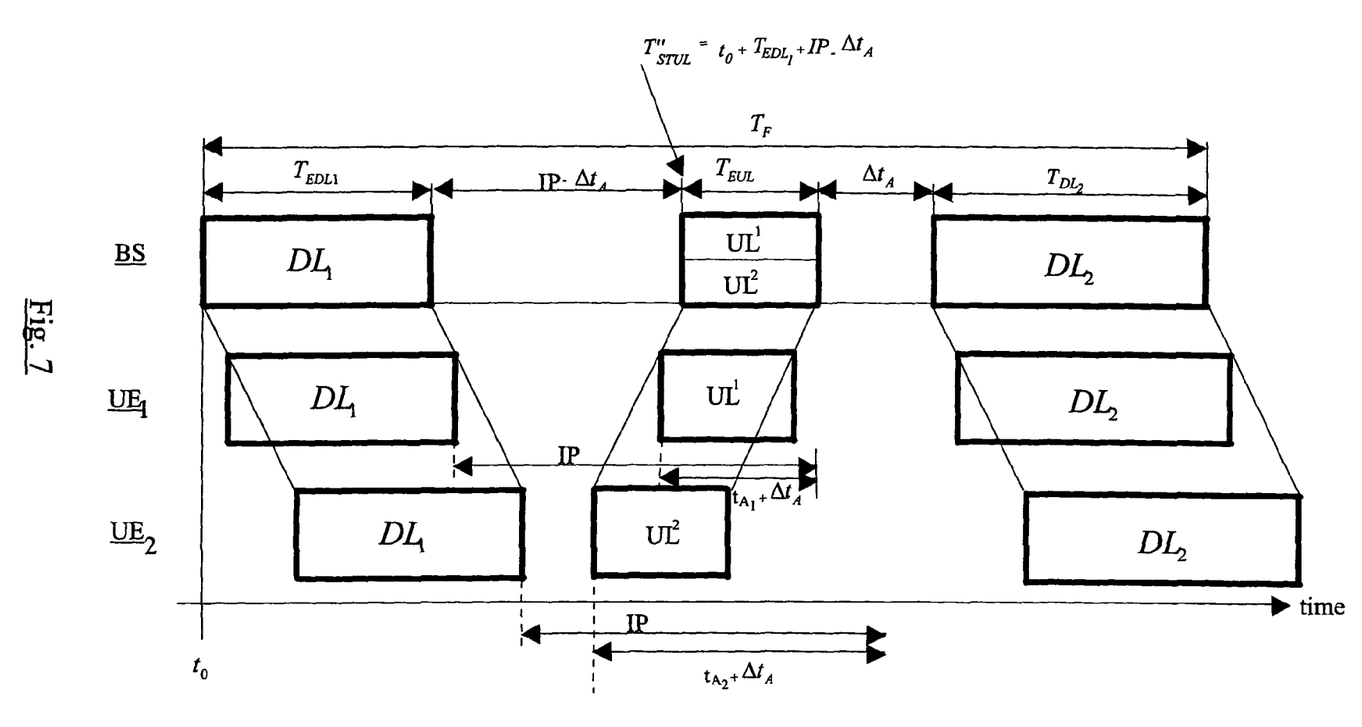
FIG. 7 represents chronograms which illustrate the use of the timing advance mechanism for synchronizing uplink sub-frames according to the present invention.

FIG. 7 represents chronograms which illustrate the use of the timing advance mechanism for synchronizing the effective parts of uplink sub-frames according to the present invention. References of elements depicted in FIGS. 5 and 6 which are identical to references of elements depicted in FIG. 7 are assigned to the same elements.

To obtain enough time between the end of the reception of the effective parts of the uplink sub-frames UL and the beginning of the transmission of the effective part of the second downlink sub-frame $DL_2$, the synchronization time $T'_{STUL}$ is advanced by an incremental timing advance value $\Delta t_A$. The new synchronisation time $T''_{STUL}$ is thus equal to $t_0+T_{EDL1}+IP-\Delta t_A$.

The incremental timing advance value $\Delta t_A$ shall be greater than or equal to the uplink/downlink required minimum idle duration $T_{ULDL}$ in order to allow switchings. Furthermore, the duration $IP-\Delta t_A$ between the end of the transmission of the effective part of the first downlink sub-frame $DL_1$ and the beginning of the reception of the effective part of the uplink sub-frame UL shall be greater than or equal to the downlink/uplink required minimum idle duration $T_{DLUL}$. Thus, the incremental timing advance value $\Delta t_A$ shall be lower than or equal to the duration $IP-T_{DLUL}$.

In order to synchronise the effective parts of the uplink sub-frames transmitted from all user equipments at the synchronisation time $T''_{STUL}$, the incremental timing advance value $\Delta t_A$ is added to each timing advance value $t_{Ai}$ to be used to perform the timing advance mechanism at each user equipment $UE_i$.

The present invention may improve the spectral efficiency by reducing the frame idle period duration $T_1$ because over-dimensioning the sum of $T_{ULDL}$ and $T_{DLUL}$ may be more efficient than over-dimensioning these durations separately.

For example, assuming $T_{DLUL}=43$ µs, $T_{ULDL}=8$ µs, $T_{SDL1}=70$ µs, $T_{SUL}=60$ µs, and idle periods taken out of the preceding sub-frames, the downlink/uplink idle period $IP_{DLUL}$ would be equal to 70 µs, the uplink/downlink idle period $IP_{ULDL}$ would be equal to 60 µs and the idle period IP would be equal to 70 µs. Thus, thanks to the present invention, the frame idle period duration is reduced.

The present invention may also improve the coverage of the base station BS when $IP-\Delta t_A$ is larger than the downlink/uplink idle period $IP_{DLUL}$, which allows the base station BS to communicate with user equipments located farther than the effective cell radius R.

For example, assuming $T_{DLUL}=43$ µs, $T_{ULDL}=8$ µs, $T_{SDL1}=47$ µs, $T_{SUL}=45$ µs, and idle periods taken out of the preceding sub-frames, the downlink/uplink idle period $IP_{ULDL}$ would be equal to 47 µs, the uplink/downlink idle period $IP_{ULDL}$ would be equal to 45 µs and the idle period IP would be equal to 94 µs. Moreover, assuming $\Delta t_A$ equal to $T_{ULDL}$, the duration between the end of the transmission of the effective part of the first downlink sub-frame and the beginning of the reception of the effective part of the uplink sub-frame at the base station is increased from 47 µs to 94−8=86 µs. Despite a slight increase of $T_1$, thanks to the present invention, the coverage of the base station BS is improved by $39\times10^{-6\times3\times10^8}/2=5.85$ km (see equation 1).

According to a preferred embodiment of the present invention, the addition of the timing advance value $\Delta t_A$ and the incremental timing advance value $\Delta t_A$ is performed and the result is transmitted by the base station to each user equipment $UE_i$.

According to another embodiment of the present invention, the incremental timing advance value $\Delta t_A$ is transmitted by the base station to each of said user equipments.

According to another embodiment of the present invention, the incremental timing advance value $\Delta t_A$ is stored by each of said user equipments.

According to another embodiment of the present invention, the half duplex communication system allowing block-wise transmissions, the idle period IP is a multiple of a symbol duration which is either $T_{SDL1}$ or $T_{SUL}$.

According to another embodiment of the present invention, the half duplex communication system allowing block-wise transmissions, the idle period IP is a sum of a multiple of the duration $T_{SDL1}$ of symbols embedded into the first downlink sub-frame and a multiple of the duration $T_{SUL}$ of symbols embedded into the uplink sub-frame.

Figure 8:
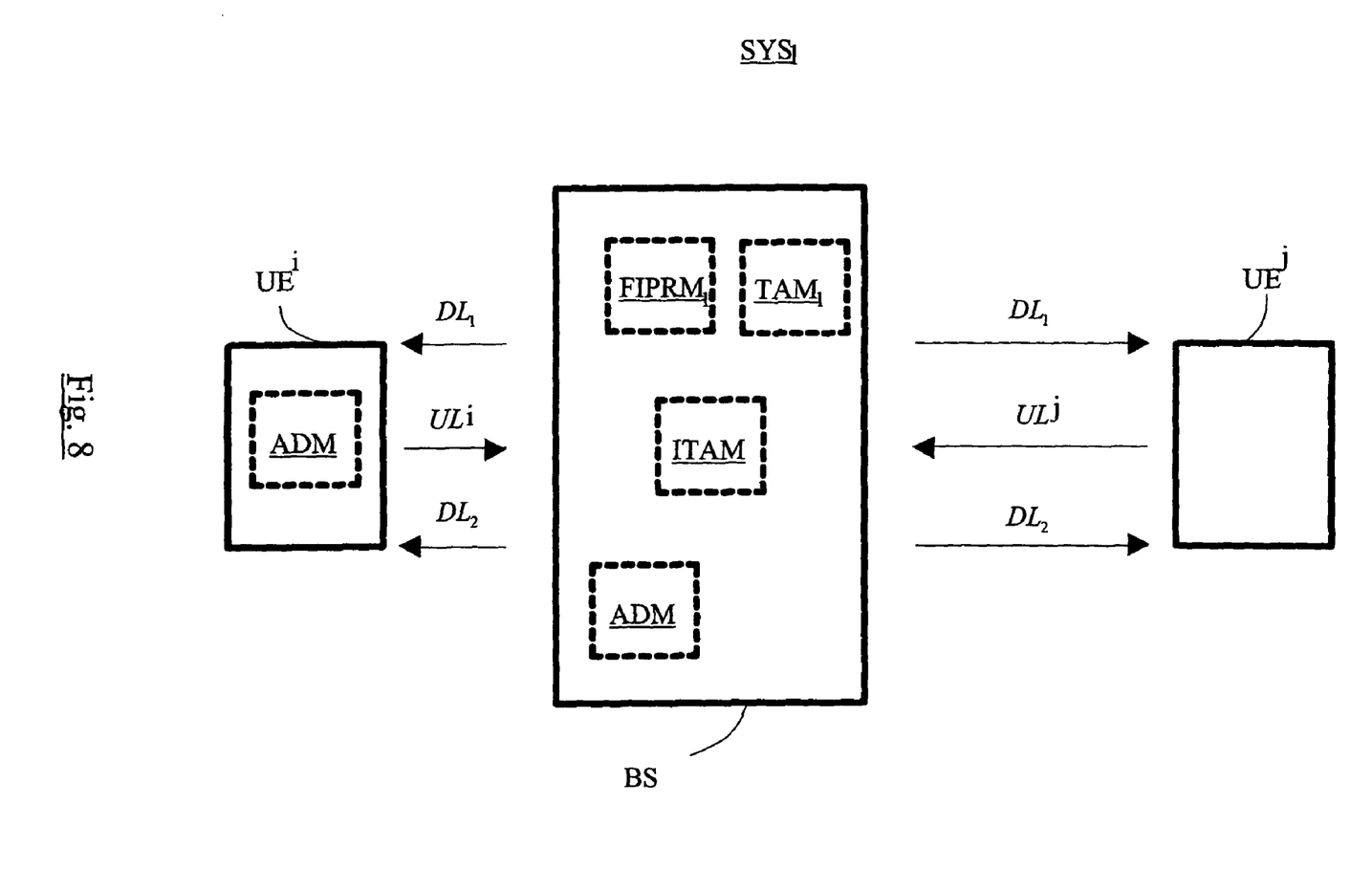
FIG. 8 represents a schema of a half duplex communication system $SYS_1$ according to the present invention.

FIG. 8 represents a schema of a half duplex communication system $SYS_1$ according to the present invention. The communication system $SYS_1$ is, for example, a Time Division Duplex (TDD) or a Half Duplex Frequency Division Duplex (HD FDD) communication system. The communication system $SYS_1$ allows half-duplex communications between a communication apparatus BS, which is for example a base station and at least one user equipments $UE_i$ and/or at least one user equipment $UE_j$ which are both, for example mobile phones or fixed wireless terminals.

The communication apparatus BS is involved in the half duplex communication system $SYS_1$ for the communication of downlink sub-frames $DL_1$ and $DL_2$ and uplink sub-frames UL with the user equipments $UE_i$ (or $UE_j$). A first downlink sub-frame $DL_1$ is transmitted by the communication apparatus BS to the user equipments $UE_i$ (or $UE_j$), followed by the uplink sub-frame UL transmitted from the user equipments $UE_i$ (or $UE_j$) to the communication apparatus BS. The uplink sub-frame UL is then itself followed by the second downlink sub-frame $DL_2$ transmitted to the user equipments $UE_i$ (or $UE_j$), the transmission of the effective part of the first downlink sub-frame $DL_1$ being separated from the reception of the effective part of the uplink sub-frame UL by at least a downlink/uplink required minimum idle duration $T_{DLUL}$, the reception of the effective part of said uplink sub-frame UL is separated from the transmission of the effective part of said second downlink sub-frame $DL_2$ by at least an uplink/downlink required minimum idle duration $T_{ULDL}$.

According to the present invention, said communication apparatus BS includes:

means $FIPRM_1$ for reserving a single idle period IP taken out of either the end of said first downlink sub-frame $DL_1$, or the beginning of said uplink sub-frame UL, or both, said single idle period IP having a duration greater than or equal to the summation of said downlink/uplink required minimum idle duration $T_{DLUL}$ and said uplink/downlink required minimum idle duration $T_{ULDL}$, means $TAM_1$ for defining a timing advance value $t_{Ai}$ (or $t_{Aj}$) for the user equipments $UE_i$ (or $UE_j$) in order that the effective parts of the uplink sub-frames sent by each of said user equipments are received at a scheduled synchronisation time $T'_{STUL}$, said scheduled synchronisation time $T'_{STUL}$ being defined such that the beginning of the reception of the effective part of said uplink sub-frame is separated from the end of the transmission of the effective part of said first downlink sub-frames by the duration of said single idle period IP, and means IATM for defining an incremental timing advance value $\Delta t_A$ to the timing advance value $t_{Ai}$ (or $t_{Aj}$) of the user equipment $UE_i$ (or $UE_j$), said incremental timing advance value $\Delta t_A$ being greater than or equal to said uplink/downlink required minimum idle duration $T_{ULDL}$ and lower than or equal to the difference between the duration of said single idle period IP and said downlink/uplink required minimum idle duration $T_{DLUL}$.

According to an embodiment of the present invention, the communication apparatus BS includes means ADM for adding said incremental timing advance value $\Delta t_A$ to the timing advance value $t_{Ai}$ of one of user equipments $UE_i$.

According to an embodiment of the present invention, the communication apparatus BS includes means for transmitting said incremental timing advance value $\Delta t_A$.

The user equipment $UE_j$ includes means for adding the incremental timing advance value $\Delta t_A$ to the timing advance value $t_{Ai}$.

Figure 9:
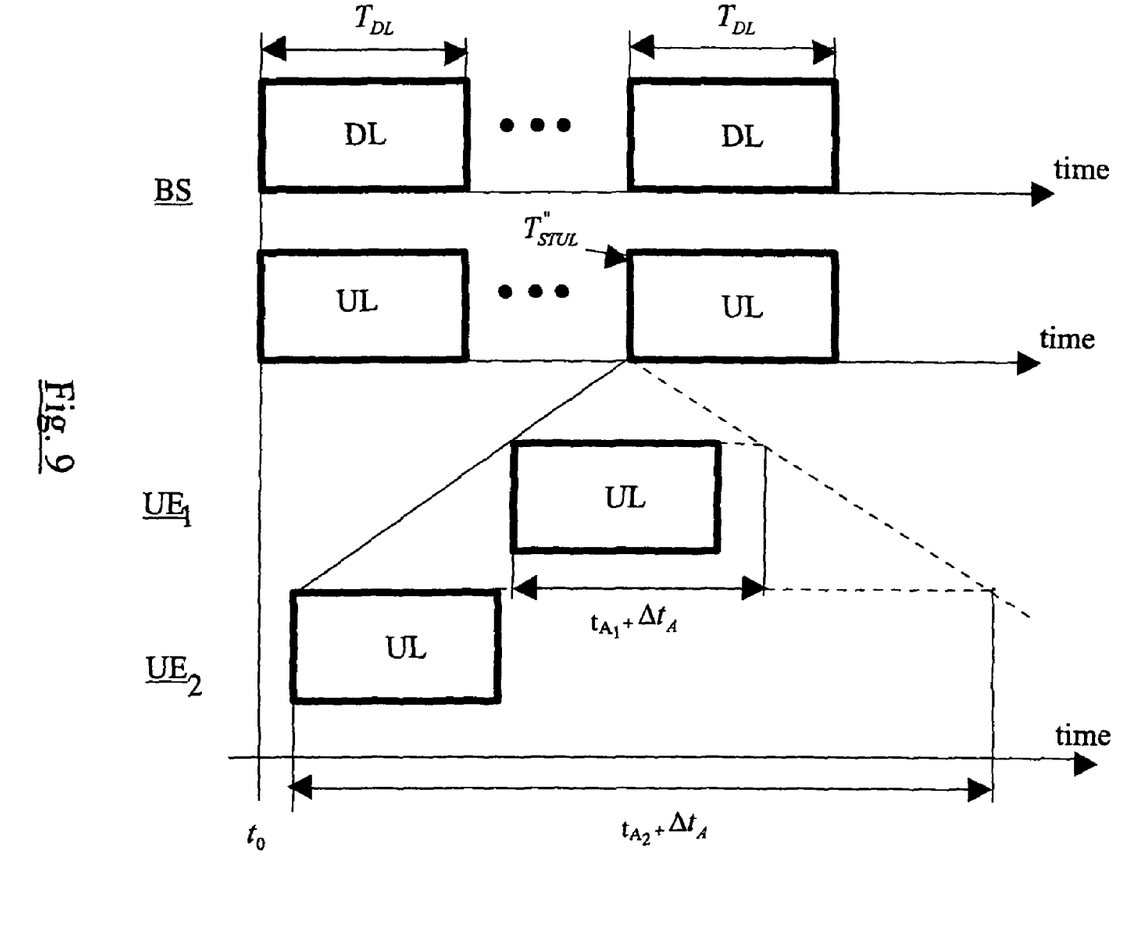
FIG. 9 represents chronograms which illustrate the use of the timing advance mechanism for synchronizing uplink sub-frames in a full duplex communication system according to the present invention.

FIG. 9 represents chronograms which illustrate the use of the timing advance mechanism for synchronizing uplink sub-frames in a full duplex communication system according to the present invention.

In a full duplex communication, downlink and uplink sub-frames are transmitted simultaneously. Moreover, no idle periods are reserved in the frame which is depicted here as a set of downlink sub-frames DL and a set of uplink sub-frames UL having the same duration $T_{DL}$.

In a full duplex communication system, the beginning of the uplink sub-frames sent by each user equipment $UE_i$ are received at a same time instant thanks to the timing advance mechanism.

According to the present invention, the incremental timing advance value $\Delta t_A$ is added to each timing advance value $t_{Ai}$ to be used to perform the timing advance mechanism at each user equipment.

This is advantageous, when the idle period (IP−$\Delta t_A$) is reserved only in a downlink sub-frame DL (in a half duplex communication) because in that case the effective parts of the uplink sub-frames transmitted from all user equipments using either a full or half duplex communication are synchronised at a same time $T''_{STUL}$ providing an increase of decoding performance at the base station BS. For example, when a frequency multiplexing-based transmission is used, such as OFDM-based transmission, multiple Fast Fourier Transform (FFT) are usually required to decode the uplink sub-frames present at the base station BS. Thanks to the present invention, because the uplink sub-frames are all synchronised at a same instant, a single FFT is required to retrieve information from each uplink sub-frame present at the receiver end at time $T''_{STUL}$.

The invention claimed is:

1. A method for communicating downlink and uplink sub-frames between a base station and at least one user equipment in a communication system, the method comprising:
transmitting, by the base station, a first downlink sub-frame to the at least one user equipment;
receiving, by the at least one user equipment, the first downlink sub-frame transmitted from the base station;
transmitting, by the base station, a timing advance value to the at least one user equipment, the timing advance value being prepared to be used for determining a start time of an uplink transmission by the at least one user equipment;
receiving, by the at least one user equipment, the timing advance value transmitted from the base station;
determining, by the at least one user equipment, a timing to transmit an uplink sub-frame on the basis of the timing advance value received by the at least one user equipment and an incremental value prepared prior to the determining the timing to transmit the uplink sub-frame;
transmitting, by the at least one user equipment, said uplink sub-frame to the base station at the timing determined in the determining the timing to transmit said uplink sub-frame;
receiving, by the base station, said uplink sub-frame transmitted from the at least one user equipment, the uplink sub-frame being received at a first time period after the end of the transmission of said first downlink sub-frame; and transmitting, by the base station, a second downlink sub-frame to the at least one user equipment, the second downlink sub-frame being transmitted at a second time period after the end of the reception of said uplink sub-frame, wherein a sum of the durations of the first downlink sub-frame, of the uplink-sub-frame and of the first and second time periods is equal to an integral multiple of a symbol duration or equal to a sum of integral multiples of symbol durations, the uplink and downlink sub-frames include a multiple number of symbols.

2. The method for communicating downlink and uplink sub-frames as claimed in claim 1, wherein the incremental value is greater than or equal to a switching duration for the base station to switch from a receive mode to a transmit mode.

3. The method for communicating downlink and uplink sub-frames as claimed in claim 1, wherein the incremental value is different from a integral multiples of symbol duration.

4. The method for communicating downlink and uplink sub-frames as claimed in claim 1, wherein the incremental value is greater than or equal to the switching duration for the user equipment to switch from a transmit mode to a receive mode.

* * * * *